United States Patent
Yu et al.

(10) Patent No.: US 9,646,040 B2
(45) Date of Patent: May 9, 2017

(54) CONFIGURABLE RULE FOR MONITORING DATA OF IN MEMORY DATABASE

(71) Applicant: SAP AG, Walldorf (DE)

(72) Inventors: Haiyang Yu, Shanghai (CN); Eric Du, Shanghai (CN); Jiran Ding, Shanghai (CN); Kenny Zhang, Shanghai (CN); Lily Xiao, Shanghai (CN); Tao Feng, Shanghai (CN); Williams Liu, Shanghai (CN); Chris Ge, Shanghai (CN)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 13/847,330

(22) Filed: Mar. 19, 2013

(65) Prior Publication Data

US 2014/0279836 A1   Sep. 18, 2014

(30) Foreign Application Priority Data

Mar. 13, 2013 (CN) .......................... 2013 1 0079953

(51) Int. Cl.
   *G06F 17/30* (2006.01)

(52) U.S. Cl.
   CPC .............................. *G06F 17/30371* (2013.01)

(58) Field of Classification Search
   CPC ................... G06F 17/30371; G06F 17/30345
   USPC ...................................... 707/603, 609; 726/1
   See application file for complete search history.

(56) References Cited

U.S. PATENT DOCUMENTS

| | | | | |
|---|---|---|---|---|
| 4,497,039 | A * | 1/1985 | Kitakami | G06F 7/22 |
| 2002/0087500 | A1* | 7/2002 | Berkowitz | G06F 17/30371 |
| 2005/0209876 | A1* | 9/2005 | Kennis | G06F 17/30569 726/1 |
| 2008/0148346 | A1* | 6/2008 | Gill | H04L 63/20 726/1 |
| 2010/0205170 | A1* | 8/2010 | Barsness | G06F 17/30498 707/714 |
| 2010/0262444 | A1* | 10/2010 | Atwal | G06Q 40/025 705/38 |

(Continued)

OTHER PUBLICATIONS

Vizard, Michael, "The Rise of In-Memory Databases" Jul. 13, 2012, Copyright 1990-2015 Dice www.insights.dice.com.*

(Continued)

*Primary Examiner* — Mohammad S Rostami
*Assistant Examiner* — Robert F May
(74) *Attorney, Agent, or Firm* — Fountainhead Law Group P.C.

(57) ABSTRACT

Embodiments relate to the implementation of configurable rules that automatically monitor large volumes of data stored in a database. Certain embodiments may leverage the high processing power available to the database engine of an in memory database, in order to perform analysis of large data volumes for compliance and other purposes. Particular embodiments may utilize ABAP Database Connectivity (ADBC) to a HANA in memory database available from SAP AG, in order to implement and execute configurable rules in connection with governance, risk, and compliance (GRC) of large volumes of data stored therein. In various embodiments, an analysis engine in the application layer may rely upon the in memory database engine to execute at least some logic of the configurable rules.

17 Claims, 7 Drawing Sheets

(56) References Cited

U.S. PATENT DOCUMENTS

| | | | | |
|---|---|---|---|---|
| 2010/0324952 | A1* | 12/2010 | Bastos | G06Q 10/00 |
| | | | | 705/7.28 |
| 2012/0011077 | A1* | 1/2012 | Bhagat | G06F 21/554 |
| | | | | 705/317 |
| 2013/0117196 | A1* | 5/2013 | Fuad | G06Q 10/10 |
| | | | | 705/36 R |
| 2014/0149340 | A1* | 5/2014 | Christoph | G06F 8/30 |
| | | | | 707/609 |

OTHER PUBLICATIONS

Khan, Irfan "Falling RAM Prices Drive In-Memory Database Surge" Oct. 24, 2012, SAP Business Information www.blogs.sap.com.*

Internet article entitled "SAP Advances GRC Strategy—OVUM," print date Mar. 17, 2011.

French Caldwell and Paul E. Proctor, "Continuous Controls Monitoring for Transactions: The Next Frontier for GRC Automation," Publication Date: Jan. 15, 2009. Gartner—Research.

\* cited by examiner

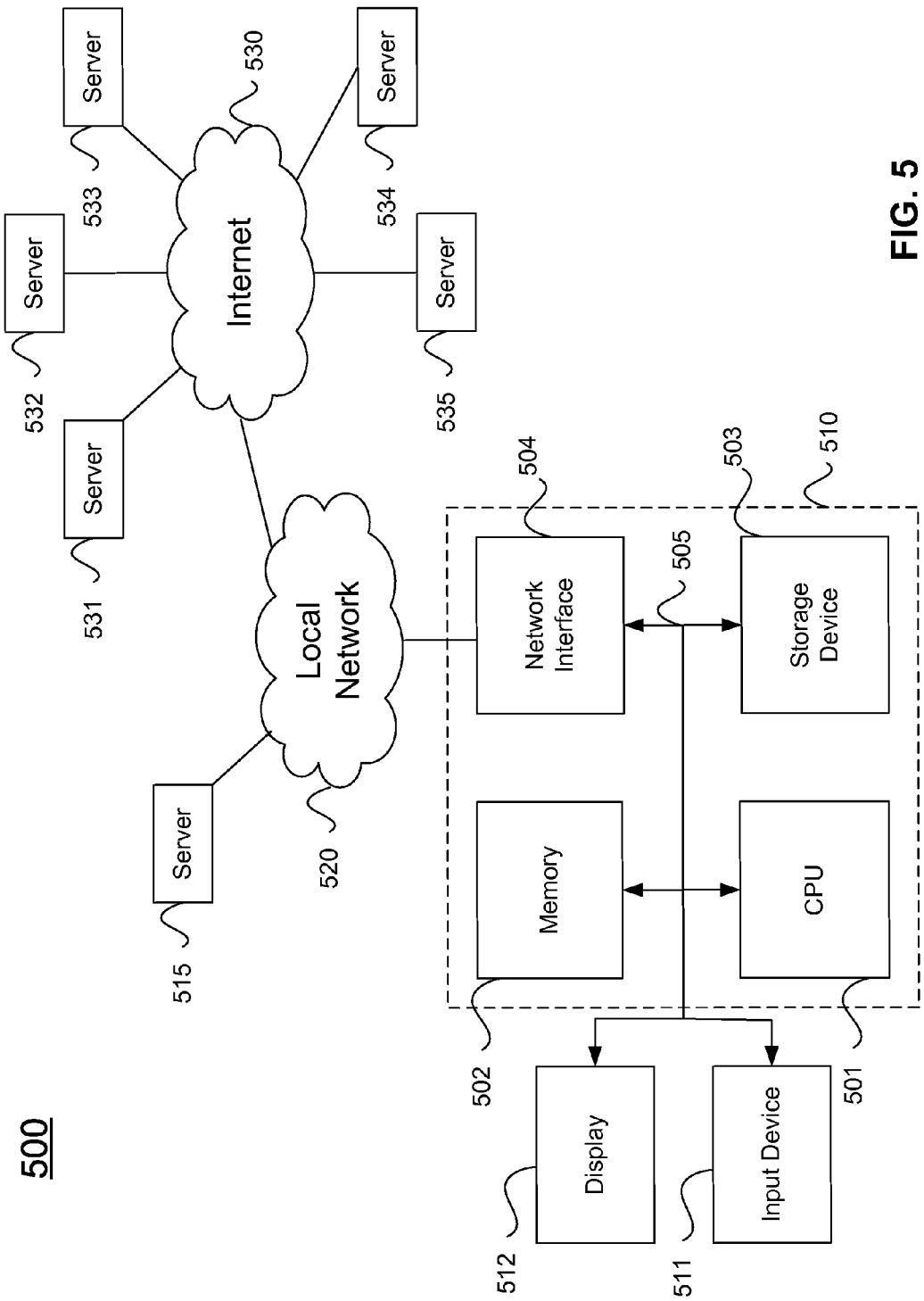

CONFIGURABLE RULE FOR MONITORING DATA OF IN MEMORY DATABASE

BACKGROUND

Embodiments relate to databases and in particular to efficient monitoring and analysis of large data volumes, for example to identify Governance, Risk, and Compliance (GRC) issues.

Unless otherwise indicated herein, the approaches described in this section are not prior art to the claims in this application and are not admitted to be prior art by inclusion in this section.

Current business environments are experiencing the generation of increasingly large volumes of business data. The growing amounts of business data that are available, can offer both opportunities and challenges to an enterprise.

Specifically, large volumes of business data can offer unparalleled visibility for garnering detailed insight into past and present business activity. Such insight can in turn provide the basis for predicting into future events, for example the accurate extrapolation of growth trajectories.

The availability of large volumes of business data can also give rise to potential challenges. In particular, an enterprise may need to recognize and handle certain types of information in a manner compliant with various existing domestic, international, and internal regulatory regime (e.g. relating to issues such as privacy and/or security).

Accordingly, the ability to efficiently and accurately analyze large volumes of data to identify compliance and other issues, is desirable. Even more desirable is for such analysis of large data volumes to take place in a manner accessible to ordinary business users.

The present disclosure addresses these and other issues with methods and apparatuses providing configurable rules for automatically monitoring large volumes of data in an in memory database.

SUMMARY

Embodiments relate to the implementation of configurable rules that automatically monitor large volumes of data stored in a database. Certain embodiments may leverage the high processing power available to the database engine of an in memory database, in order to perform analysis of large data volumes for compliance and other purposes. Particular embodiments may utilize ABAP Database Connectivity (ADBC) to a HANA in memory database available from SAP AG, in order to implement and execute configurable rules in connection with governance, risk, and compliance (GRC) of large volumes of data stored therein. In various embodiments, an analysis engine in the application layer may rely upon the in memory database engine to execute at least some logic of the configurable rules.

An embodiment of a computer-implemented method comprises providing in an application layer, an analysis engine in communication with a ruleset including a rule for identifying an issue with a data record. The method further comprises causing the analysis engine to communicate with a database engine of an underlying database layer, to access information of an in memory database. The method further comprises causing the analysis engine to apply the rule to the information in order to identify whether the issue is present, wherein the database engine is configured to execute at least some logic of the rule to the information.

An embodiment of a non-transitory computer readable storage medium embodies a computer program for performing a method. The method comprises providing in an application layer, an analysis engine in communication with a ruleset including a rule for identifying an issue with a data record. The method further comprises causing the analysis engine to communicate with a database engine of an underlying database layer, to access information of an in memory database. The method further comprises causing the analysis engine to apply the rule to the information in order to identify whether the issue is present, wherein the database engine is configured to execute at least some logic of the rule to the information.

An embodiment of a computer system comprises one or more processors and a software program executable on said computer system. The software program is configured to provide in an application layer, an analysis engine in communication with a ruleset including a rule for identifying an issue with a data record. The software program is further configured to cause the analysis engine to communicate with a database engine of an underlying database layer, to access information of an in memory database. The software program is further configured to cause the analysis engine to apply the rule to the information in order to identify whether the issue is present, wherein the database engine is configured to execute at least some logic of the rule to the information.

In certain embodiments the issue relates to Governance, Risk, or Compliance (GRC).

According to some embodiments the issue relates to privacy or security.

In particular embodiments the analysis engine and the ruleset comprise an existing Process Control (PC) application in the application layer.

Various embodiments may further comprise causing a user to access the application layer in order to create the rule.

According to certain embodiments the analysis engine communicates with the database engine through open SQL.

Particular embodiments may further comprise performing a remediation procedure to correct the issue.

The following detailed description and accompanying drawings provide a better understanding of the nature and advantages of particular embodiments.

BRIEF DESCRIPTION OF THE DRAWINGS

FIG. 5 illustrates an example of a computer system.

DETAILED DESCRIPTION

Described herein are techniques for automatic monitoring of large data volumes for compliance and other issues. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of various embodiments. It will be evident, however, to one skilled in the art that the present invention as defined by the claims may include some or all of the features in these examples alone or in combination with other features described below, and may further include modifications and equivalents of the features and concepts described herein.

Figure 1:
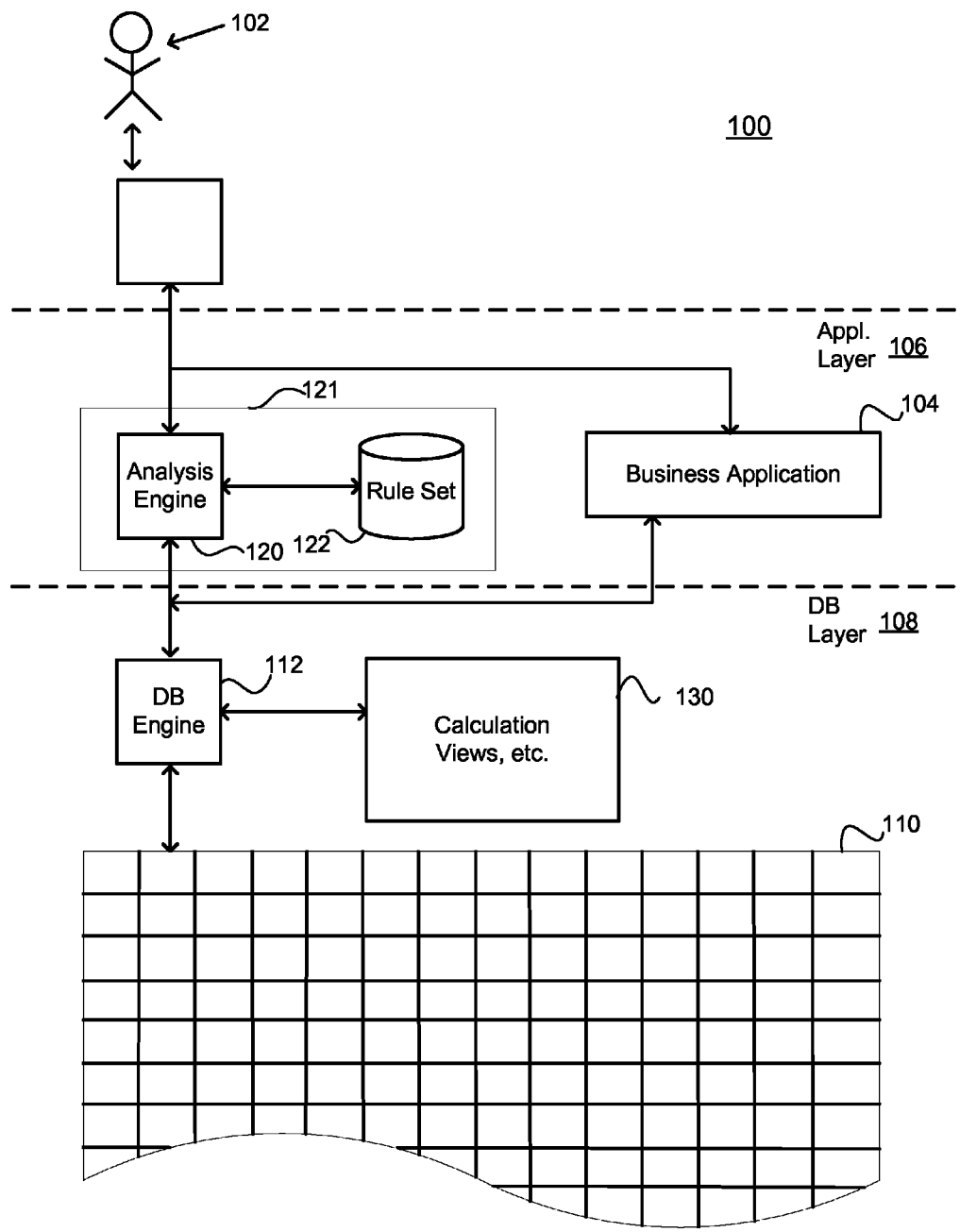
FIG. 1 shows a simplified view of an embodiment of a system according to an embodiment that is configured to implement data monitoring and analysis.

Embodiments develop configurable rules that leverage the high processing power available to an in memory database system, in order to perform data monitoring and analysis of large volumes of stored data. FIG. 1 shows a simplified overview of a system according to an embodiment.

Specifically, a user 102 is configured to interact through a user device 103 (e.g. desktop, workstation, tablet, smartphone) with a business application 104 that is present in an application layer 106. One example of such a business application is an Enterprise Resource Planning (ERP) application.

Applications residing within the application layer 106, are in turn in communication with an underlying database layer 108 which includes a database 110. Access to data within the database from outside the database layer, is controlled by a database engine 112.

Certain types of business applications such as ERP, may be in direct communication with the underlying database layer as shown in FIG. 1. Other types of business applications, for example GRC applications, may be in indirect communication with the underlying database layer through another application, for example the application 121.

Specifically, according to particular embodiments, the application layer further comprises a Process Control (PC) application 121 that includes an analysis engine 120 referencing a ruleset 122. Through the PC application, user may interact with the analysis engine and the ruleset in order to create and configure rules that are to be executed as described below.

In particular, the analysis engine is configured to communicate with the database engine, to execute rules of the ruleset 122 whose logic identifies compliance or other issues within data stored in the database. The analysis engine may leverage the fast processing speed and high performance of the database engine, in order to execute the rules in a rapid and accurate manner on large data volumes. This may be done utilizing calculation views and stored procedures 130 that are present within the database layer.

Figure 2:
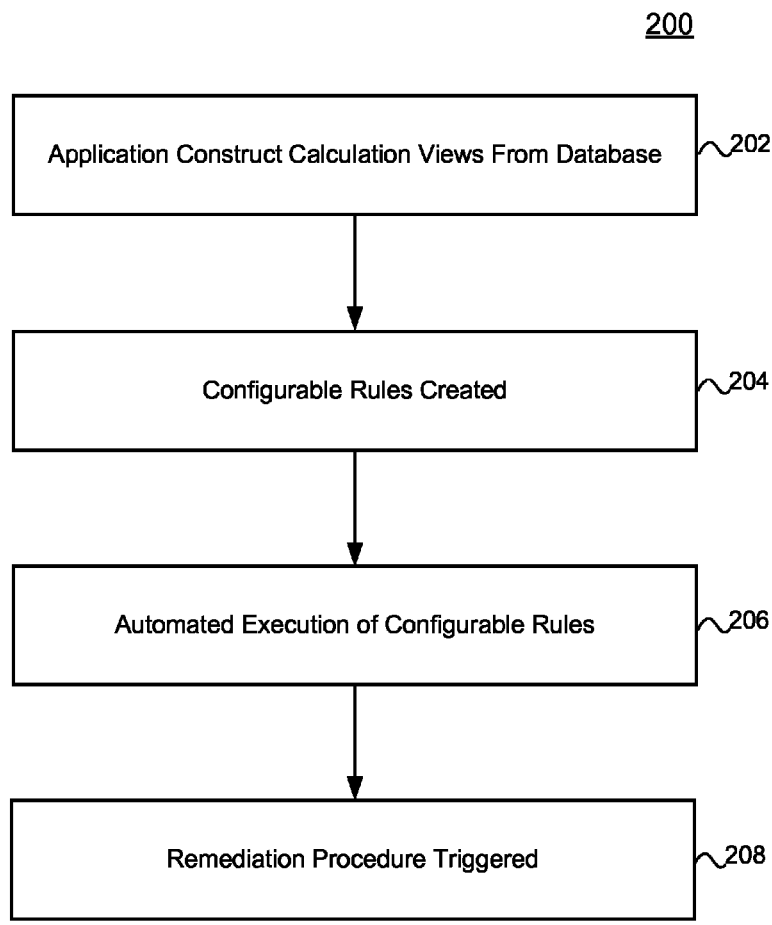
FIG. 2 is a simplified flow diagram of a method according to an embodiment.

FIG. 2 presents a simplified flow diagram illustrating operation of a method 200 according to an embodiment. In a first step 202, an Enterprise Resource Planning (ERP) or any other business application system resident in an application layer, may reference a database engine present in an underlying database layer of an in memory database. An analysis engine present in the application layer will utilize calculation views to filter data and to expose the data.

In a second step 204, the user accesses a process control (PC) application in order to search for the particular relevant views within the in memory database to analyze. The user can directly use PC rule frame work and its corresponding rule engine to define a deficiency, and the corresponding detail logic that triggers the configurable rule to reveal the deficiency.

In a third step 206, the PC application automates the execution of the configurable rules in order to identify compliance and other possible issues arising within the large volumes of business data present within the database.

In the fourth step 208, the issues that are found, could trigger the implementation of a remediation procedure in the PC application. Such a remediation procedure could aid the users in taking actions to correct issues arising in connection with compliance requirements. When the procedure is completed, users could execute the rule again to check whether those issues have indeed been corrected.

Example

One example of the structure and operation of an embodiment of the present invention, is now provided in the context of the HANA™ in memory database available from SAP of Walldorf, Germany.

Figure 3:
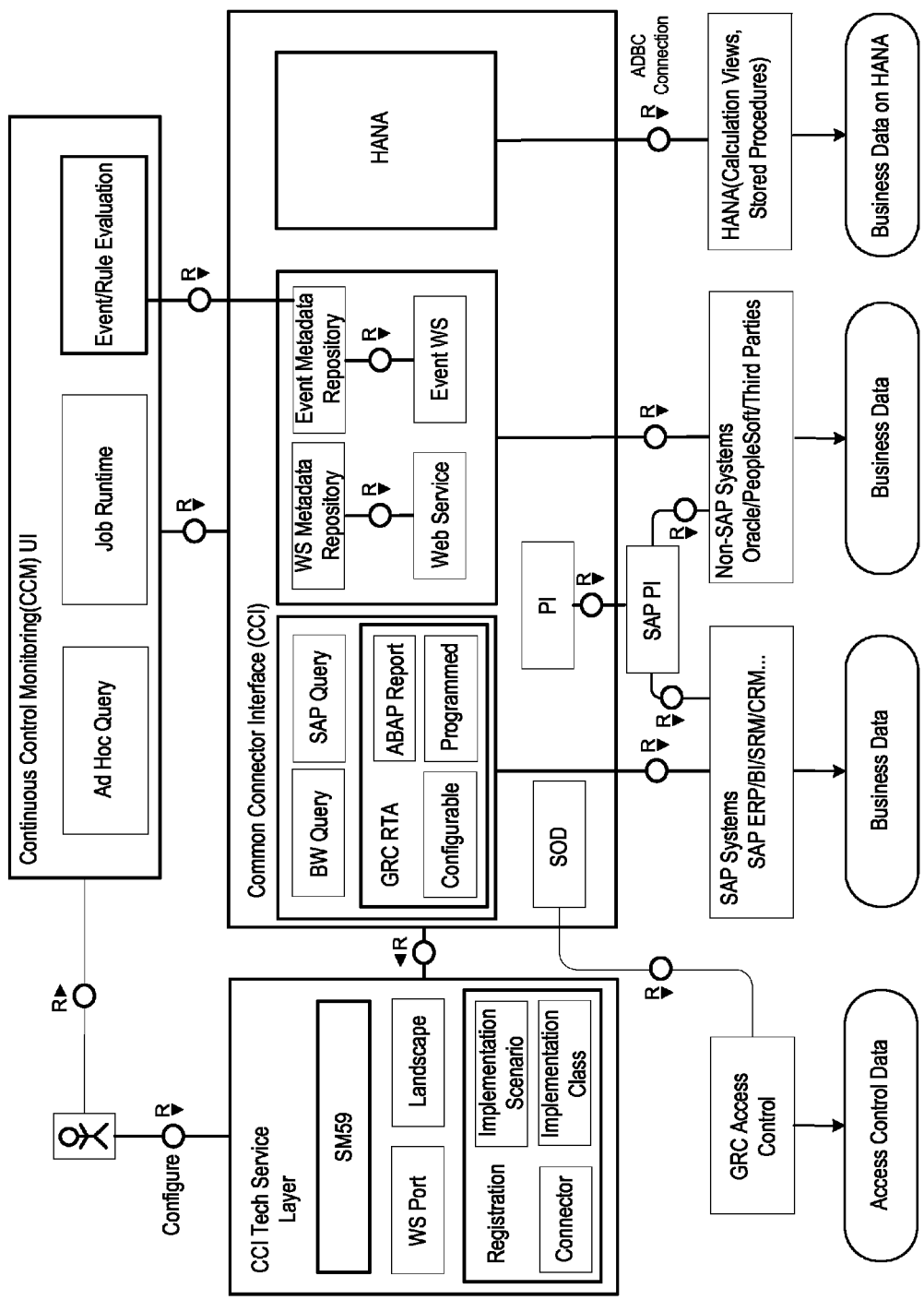
FIG. 3 is a simplified view of an exemplary architecture implementing an embodiment in conjunction with the HANA™ in memory database.

FIG. 3 is a simplified block diagram showing an overall view of an example of an architecture configured to perform analysis according to an embodiment. In particular a user is configured to interact with a Continuous Control Monitoring (CCM) portal offering a user interface. Through the CCM, the user is able to formulate and pose ad-hoc queries to stored database information. The user is also able to monitor job runtime, and to perform rule/event evaluation.

This particular example utilized the Business Rule Framework Plus (BRF+) application and ruleset available from SAP AG, in order to create the configurable rules.

The application UI is in turn in communication with a Common Connector Interface (CCI). Via the CCI, a user may access information of the HANA™ database According to embodiments, a new CCM sub scenario may be created for HANA™ based monitoring. Connection to HANA™ is achieved by integration of the framework CCI with DB connections.

Supported HANA™ contents may include, but are not limited to, calculation views, column tables or column views, and stored procedures. Embodiments may access the Calculation Views and stored procedures within the database, utilizing native SQL with ADBC (ABAP Database Connectivity).

Calculation to perform monitoring/analysis of large data volumes, may take place at least partially within the database layer. The in memory database could utilize both hardware and software innovation in order to extend its ability to process raw data in database. Thus the in memory database has powerful calculation ability as compared with other database types. This allows complicated business logic to be pushed down to the database layer.

FIG. 3 shows that ad-hoc querying is supported from both Data Sources and Business Rules. Then, users could communicate with the database in order to obtain an overview of result of calculation views/stored procedure during rule creation.

For business logic not completed in calculation view/stored procedures, GRC rule calculations for additional logic may be implemented using BRF+.

Using native SQL, the analysis engine could access objects that are not maintained in a data dictionary (DDIC), such as calculation views defined in database.

In native SQL like other database-specific commands, data design language (DDL) or data manipulation language (DML) can be used. DDL statements are generally used to define the schema (e.g., CREATE TABLE, CREATE VIEW). DML statements are generally used to manipulate and query data (e.g., INSERT, UPDATE, DELETE, SELECT).

The following shows an example of native SQL code that may be used for accessing database information.

```
*** open connection
P_DBCON = CL_SQL_CONNECTION=>GET_CONNECTION(
DBCON ).
CREATE OBJECT P_SQL
 EXPORTING
  CON_REF = P_DBCON.
*** execute SQL command
SQL_CMD = 'SELECT * FROM ZHA_FLIGHT WHERE CARRID =
"LH"'.
P_RESULT = P_SQL->EXECUTE_QUERY( SQL_CMD ).
*** bind output structure
GET REFERENCE OF T_FLIGHT INTO PT_FLIGHT.
P_RESULT->SET_PARAM_TABLE( ITAB_REF = PT_FLIGHT ).
*** fetch one package
P_RESULT->NEXT_PACKAGE( ).
*** close cursor
P_RESULT->CLOSE( ).
```

For Open SQL, the following code could be used:

```
SELECT * FROM ZHA_FLIGHT CONNECTION (DBCON)
  INTO TABLE T_FLIGHT
  WHERE CARRID = 'LH'.
```

The following are some examples of types of SAP In-Memory Database Specific SQL statements.

```
SQL Extensions for Column Store: CREATE COLUMN TABLE . . .
WITH PARAMETERS; ALTER TABLE . . . WITH PARAMATERS;
CREATE COLUMN VIEW . . . WITH PARAMETERS; ALTER
SYSTEM ADD SCENARIO '<xml>' WITH PARAMETERS('flags' =
'<flags>'); CREATE / ALTER / DROP PLANNING SESSION.
SQL Extensions (General): CREATE INSERT ONLY (ROW|COLUMN)
TABLE; CREATE (GLOBAL|LOCAL) TEMPORARY (ROW|
COLUMN) TABLE; Admin Calls (e.g., CREATE TENANT, ALTER
SYSTEM CLEAR TRACES, ALTER SYSTEM INIFILE . . . SET. . . )
Alter System Commands and System Tables for Database
Monitoring.
```

In order to evaluate the capabilities of this example, a test run was performed in which the analysis engine was asked to identify duplicate invoices from a large data pool. The business requirement is to control the same vendor invoice number from being posted in the system more than once.

In general, the data present in an Accounting Document table (BSEG) may number in the millions. In this particular example, a set of 11,290,058 records was provided from a (BSEG) table stored in a HANA™ database.

Using other than an in memory database, the data would need to be extracted from the database to the application layer in order to complete the calculation and to obtain the results. Or, users may need to pre-aggregate data to datasets in order to provide the values.

By contrast, leveraging the processing power of an in-memory database, permits the join and compare calculations to be performed in the database layer. This allows the application to consume the result in seconds.

Figure 3A:
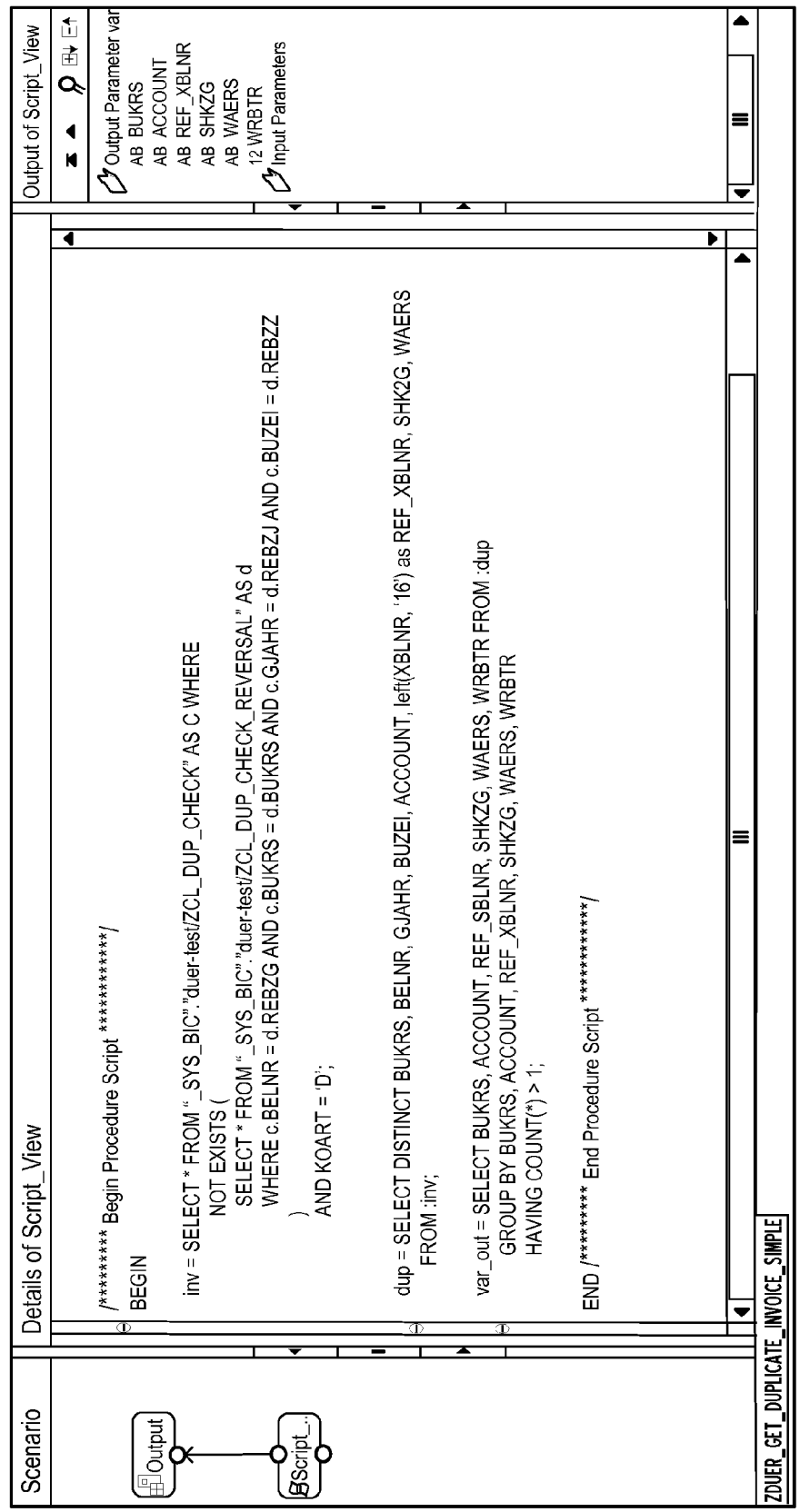
FIG. 3A is a simplified view the script utilized to express a configurable rule according to an embodiment.
Figure 3C:
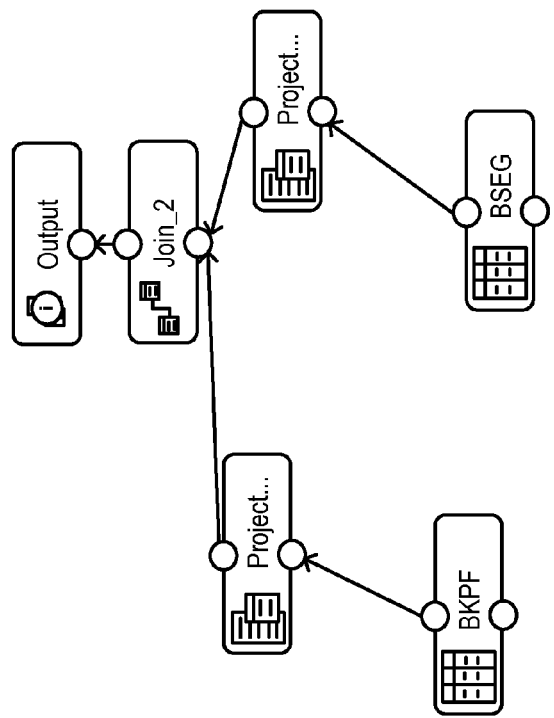
FIGS. 3B-C show the calculation views relied upon by the script of FIG. 3A.
Figure 3B:
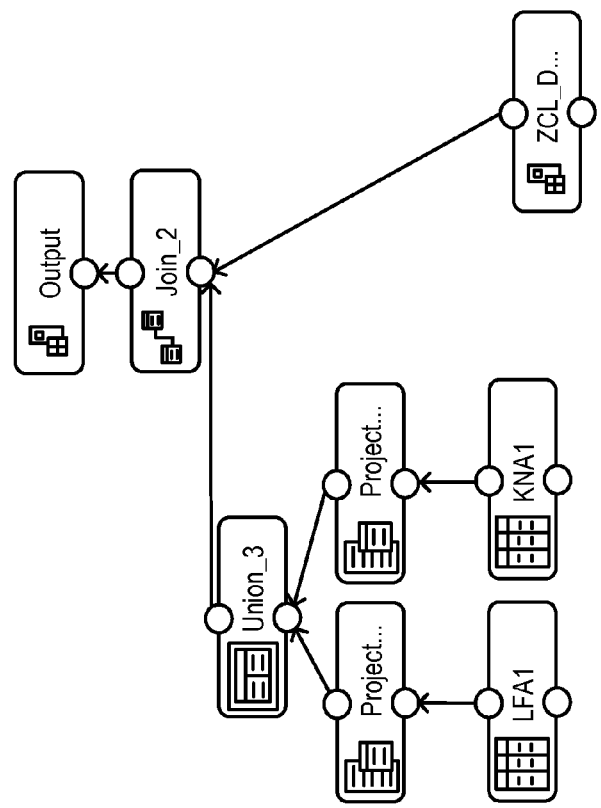

Specifically, FIG. 3A is a simplified view the script utilized to express a configurable rule according to this example. FIG. 3B shows the calculation view ZCL_DUP_CHECK that is utilized by the script of FIG. 3A. FIG. 3C shows the calculation view ZCL_DUP_CHECK_REVERSAL that is utilized by the script of FIG. 3A.

Here, by leveraging the high computational power of the HANA™ database, only 35 seconds were required to identify 243 duplicate invoices out of this large (11+ million records) volume of data.

By contrast, conducting such an analysis task in other than an in memory database environment, would be expected to take much longer. For example, without HANA a limited data volume is available for analysis (e.g. 1000 entries in each package). Such a conventional approach could involve low performance, with rule calculation in an ABAP program or BRF+. Possible undesirable side effects of such a conventional approach, would be high occupation of background processes, as well as internal table memory overflow.

The test just described illustrates a real example percentage of completion (POC) of FIN-GRC integration inside Financial, GRC and Insurance (FGI). The CCM framework has the ability to integrate the HANA™ calculation view created for HANA of ERP on HANA™.

While the previous example specifically names the HANA™ database available from SAP AG, embodiments are not limited to this or any other specific form of in memory database. In addition to the HANA just mentioned, examples of others include but are not limited to the SYBASE IQ database also available from SAP AG; the Microsoft Embedded SQL for C (ESQL/C) database available from Microsoft Corp. of Redmond, Wash.; and the Exalytics In-Memory database available from Oracle Corp. of Redwood Shores, Calif.

The use of configurable rules for monitoring and analysis according to various embodiments, may offer certain benefits. For example, some embodiments may allow a user to create and execute rules utilizing an interface with which they are already familiar (e.g. an existing process control interface). Another possible benefit is the rapid execution of rules to accomplish GRC analysis, as is made possible by the powerful processing capability of the in memory database engine.

Figure 4:
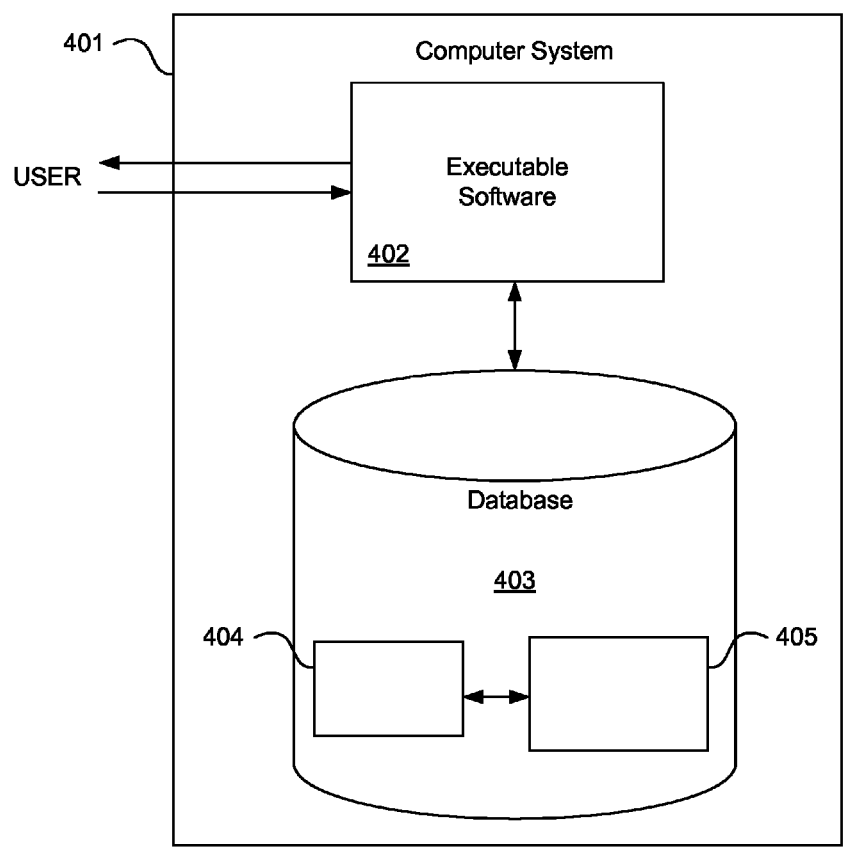
FIG. 4 illustrates hardware of a special purpose computing machine configured to perform data monitoring and/or analysis according to an embodiment.

FIG. 4 illustrates hardware of a special purpose computing machine configured to perform data monitoring and/or analysis according to an embodiment. In particular, computer system 400 comprises a processor 402 that is in electronic communication with a non-transitory computer-readable storage medium 403. This computer-readable storage medium has stored thereon code 405 corresponding to an analysis engine. Code 404 corresponds to a ruleset. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   providing in an application layer, an analysis engine in communication with a ruleset including a rule for identifying an issue with a data record stored in a table of an underlying database layer containing an in memory database;
   causing the analysis engine to communicate with an in memory database engine of the underlying database layer, to access information of the in memory database, the information comprising a column store calculation view including the data record, wherein the analysis engine communicates with the in memory database engine through open SQL and through SQL extension code to create and alter the column store calculation view; and
   causing the analysis engine to apply the rule to the information in order to identify whether the issue is present, wherein a computational power of the in memory database engine is leveraged to execute at least some logic of the rule to the information, and the computational power of the in memory database engine is further leveraged to execute a join operation to create the column store calculation view.

2. A method as in claim 1 wherein the issue relates to Governance, Risk, or Compliance (GRC).

3. A method as in claim 1 wherein the issue relates to privacy or security.

4. A method as in claim 1 wherein the analysis engine and the ruleset comprise an existing Process Control (PC) application in the application layer.

5. A method as in claim 1 further comprising causing a user to access the application layer in order to create the rule.

6. A method as in claim 1 further comprising performing a remediation procedure to correct the issue.

7. A non-transitory computer readable storage medium embodying a computer program for performing a method, said method comprising:
   providing in an application layer, an analysis engine in communication with a ruleset including a rule for identifying an issue with a data record stored in a table of an underlying database layer containing an in memory database;
   causing the analysis engine to communicate with an in memory database engine of the underlying database layer, to access information of the in memory database, the information comprising a column store calculation view including the data record, wherein the analysis engine communicates with the in memory database engine through open SQL and through SQL extension code to create and alter the column store calculation view; and
   causing the analysis engine to apply the rule to the information in order to identify whether the issue is present, wherein a computational power of the in memory database engine is leveraged to execute at least some logic of the rule to the information, and the computational power of the in memory database engine is further leveraged to execute a join operation to create the column store calculation view.

8. A non-transitory computer readable storage medium as in claim 7 wherein the issue relates to Governance, Risk, or Compliance (GRC).

9. A non-transitory computer readable storage medium as in claim 7 wherein the issue relates to privacy or security.

10. A non-transitory computer readable storage medium as in claim 7 wherein the analysis engine and the ruleset comprise an existing Process Control (PC) application.

11. A non-transitory computer readable storage medium as in claim 7 wherein the method further comprises causing a user to access the application layer in order to create the rule.

12. A non-transitory computer readable storage medium as in claim 7 wherein the method further comprises performing a remediation procedure to correct the issue.

13. A computer system comprising:
one or more processors;
a software program, executable on said computer system, the software program configured to:
provide in an application layer, an analysis engine in communication with a ruleset including a rule for identifying an issue with a data record stored in a table of an underlying database layer containing an in memory database;
cause the analysis engine to communicate with an in memory database engine of the underlying database layer, to access information of the in memory database, the information comprising a column store calculation view including the data record, wherein the analysis engine communicates with the in memory database engine through open SQL and through SQL extension code to create and alter the column store calculation view; and
cause the analysis engine to apply the rule to the information in order to identify whether the issue is present, wherein a computational power of the in memory database engine is leveraged to execute at least some logic of the rule to the information, and the computational power of the in memory database engine is further leveraged to execute a join operation to create the column store calculation view.

14. A computer system as in claim 13 wherein the issue relates to Governance, Risk, or Compliance (GRC).

15. A computer system as in claim 13 wherein the issue relates to privacy or security.

16. A computer system as in claim 13 wherein the analysis engine and the ruleset comprise an existing Process Control (PC) application in the application layer.

17. A computer system as in claim 13 wherein the software program is further configured to cause a user to access the application layer in order to create the rule.

* * * * *